INVENTOR
Harold G. Baxter.
BY
ATTORNEY

May 15, 1934.     H. G. BAXTER     1,958,882
METERING PANEL BOARD
Filed May 1, 1930     3 Sheets-Sheet 2
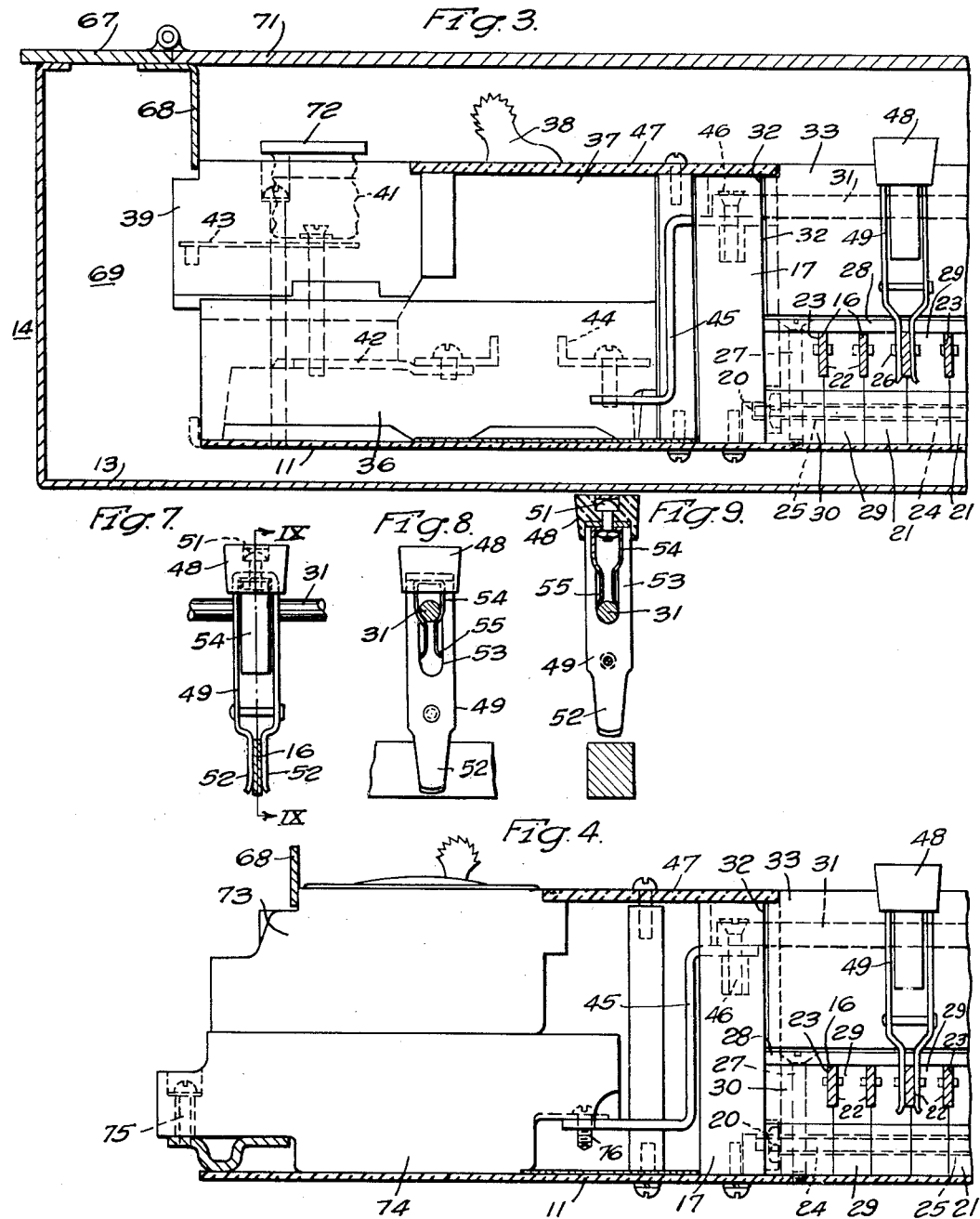
INVENTOR
Harold G. Baxter.
BY
Wesley G. Carr
ATTORNEY May 15, 1934.   H. G. BAXTER   1,958,882
METERING PANEL BOARD
Filed May 1, 1930   3 Sheets-Sheet 3
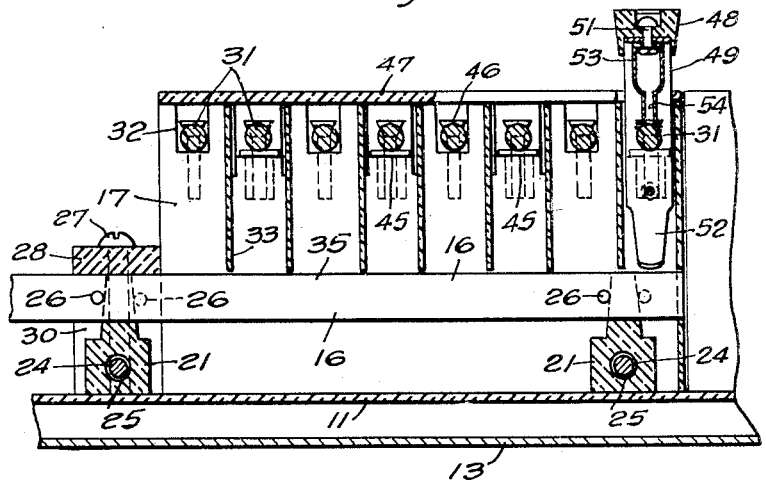
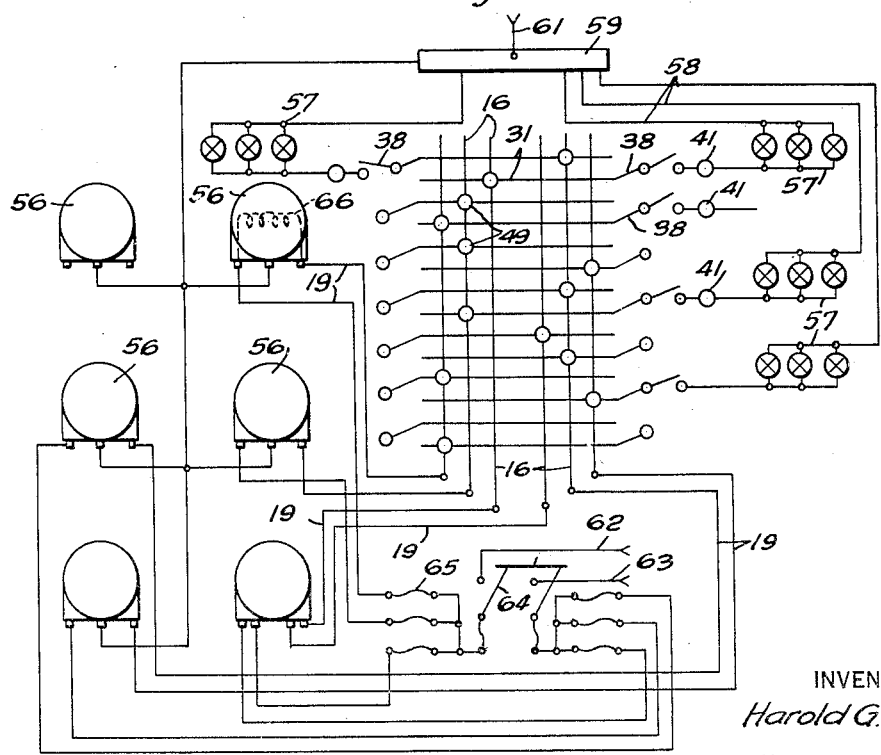
INVENTOR
*Harold G. Baxter*
BY
ATTORNEY Patented May 15, 1934

1,958,882

UNITED STATES PATENT OFFICE 1,958,882

METERING PANEL BOARD

Harold G. Baxter, Baldwin, N. Y., assignor to Westinghouse Electric & Manufacturing Company, a corporation of Pennsylvania Application May 1, 1930, Serial No. 449,058

6 Claims. (Cl. 175—370)

My invention relates to panelboards and particularly to metering panelboards wherein a group of parallel-spaced metering bars are mounted within a cabinet and the branch line circuits connected thereto by means of selector contacts mounted upon slide bars disposed above the metering bars, whereby any branch line circuit may be connected to a desired meter, or the connections transferred to another meter.

An object of my invention is to provide a metering panelboard wherein the metering bars are supported on insulating blocks that, when clamped together, secure the metering bars in place and which facilitate the accommodation of any number of metering bars by simply adding the standard insulating blocks.

A further object of my invention is to provide a metering panelboard wherein the current-controlling elements, such as switches and fuses, are mounted on insulating panel units disposed on opposite sides of the group of metering bars, and wherein any number of circuits may be accommodated by adding, in side-by-side relation, a desired number of panel units.

A further object of my invention is to provide a metering panelboard wherein the metering bars are retained in assembled position by means of insulating blocks secured to terminal-block units, and which serve to separate, and insulate from one another, the slide bars upon which the selector contacts, for connecting a circuit to a desired metering bar, are mounted.

A further object of my invention is to provide a metering panelboard having the above noted characteristics wherein the selector contacts are slidably mounted upon the slide bars for longitudinal movement therealong and for transverse movement, for the purpose of withdrawing them from engagement with the metering bars.

A further object of my invention is to provide a selector contact for a metering panel having the characteristics above noted, wherein the selector contact is releasably retained in its operative and inoperative positions by a yielding conductive member associated with the contact jaws which engage the metering bars.

A further object of my invention is to provide a metering panelboard that may accommodate any desired number of metering bars and distributing circuits, and wherein the number of bars and circuits may be increased by adding standard supporting blocks for the metering bars and the circuit terminals.

A further object of my invention is to provide a metering panelboard wherein the circuit transfer mechanism for connecting the distributing circuits to selected metering bars is of a standard sectional construction, and which may be used in connection with circuit-controlling panel units having switches alone, or switches and fuses combined, or a circuit breaker in place of the switches and fuses.

These and other objects, that will be made apparent throughout the further description of my invention, are obtained by means of the apparatus hereinafter described and illustrated in the accompanying drawings, wherein Fig. 1 is an elevational view of a metering panelboard without the enclosing casing, embodying features of my invention;

Fig. 3 is a transverse sectional view through a fragment of the panelboard shown in Fig. 1, taken on the line III—III thereof;

Fig. 4 is a transverse sectional view, similar to that of Fig. 3, of a modified form of panelboard, wherein a circuit breaker is used for the circuit-controlling element;

Fig. 5 is a longitudinal sectional view of a fragment of a panelboard shown in Fig. 1, taken on the line V—V thereof;

Fig. 6 is a wiring diagram showing the manner in which a panelboard, such as shown in Fig. 1, is connected to the distributing circuits and to the meters;

Figs. 7 and 8 are side and end elevational views, respectively, of a selector contact used in the apparatus illustrated in Fig. 1, and Fig. 9 is a vertical sectional view of the selector contact shown in Fig. 7 and taken on the line IX—IX thereof.

Figure 1:
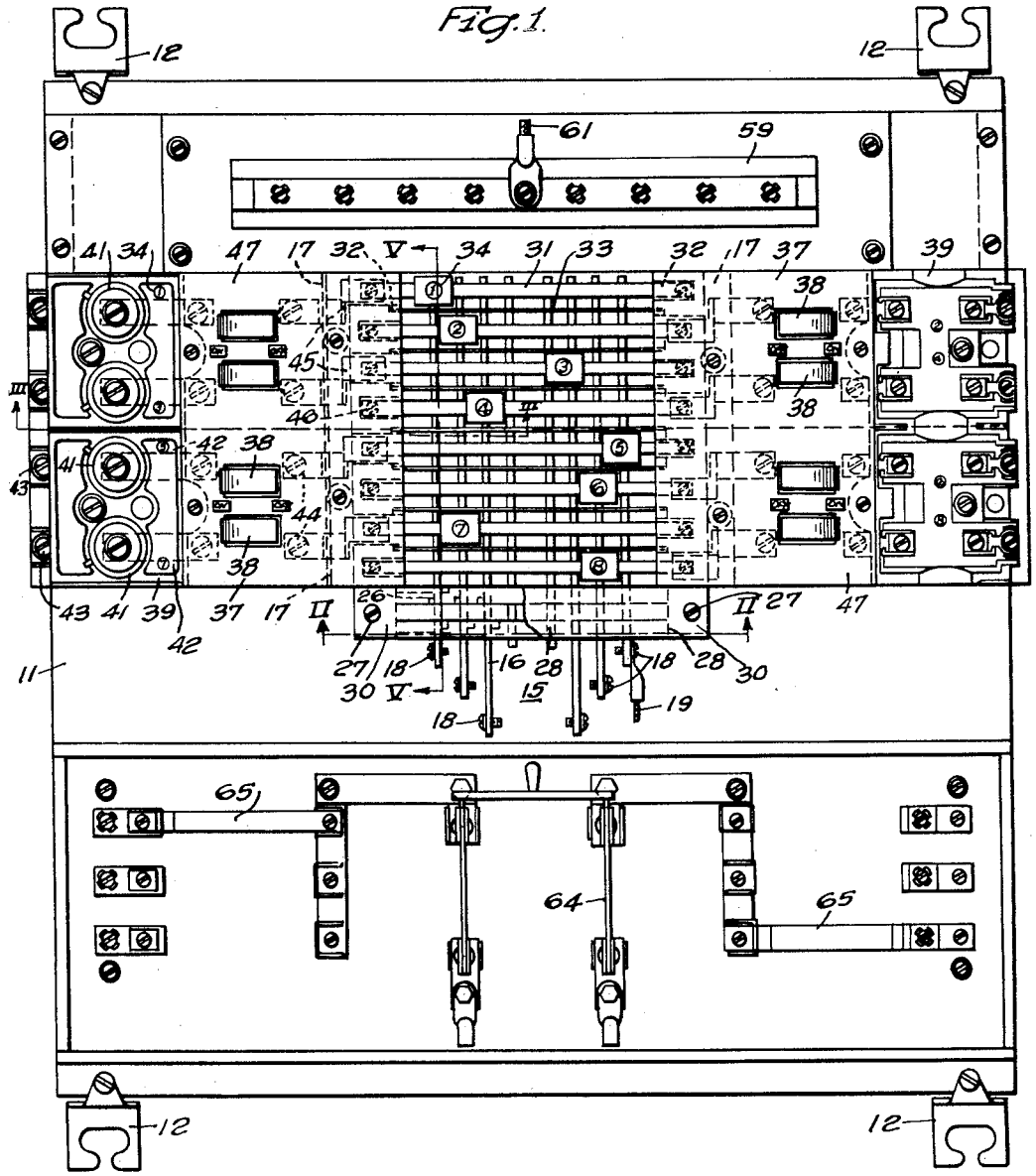
Figure 2:
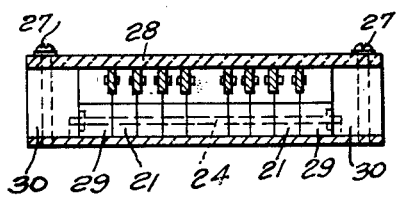
Fig. 2 is a transverse sectional view of a portion of the panelboard structure shown in Fig. 1 and taken on the line II—II thereof.

Referring to the drawings and particularly to Figs. 1, 2, and 3, the panelboard comprises a sheet-metal base pan 11 that is mounted upon attaching lugs 12 that are adjustably secured to the bottom wall 13 of a sheet-metal casing 14 in which the panelboard is mounted.

A group 15 of metering bars 16 are disposed in spaced parallel relation longitudinally of the panelboard between two rows of insulating terminal blocks 17. The lower ends of the metering bars 16 are provided with terminals 18 to which conductors 19, which extend to the meters, are connected, each bar being connected to a separate meter.

The metering bars are supported adjacent to their lower ends and at spaced intervals along the bars, as indicated in Fig. 5, between insulating blocks 21 and 29 that are disposed in side-by-side relation and are provided, on their adjacent faces, with indentations 22, (Fig. 3) which constitute notches 23 in which the metering bars 16 are securely clamped when the blocks 21 and 29 are drawn together by a through bolt 24 that extends through perforations 25 in the blocks 21.

The metering bars are provided with up-struck lugs 26 that are disposed on opposite sides of the blocks 21 and 29 of the lowermost row as indicated in Figs. 1 and 5, for preventing longitudinal displacement of the metering bars with respect to the blocks 17, which are securely fastened to the base pan 11 by means of screws 27 that extend through a cover plate 28 and the blocks 30 and are threaded into the pan 11.

The uppermost row of blocks 21 and 29, are retained in assembled relation by through bolts 24, as above described, and are held in position in the panel by the ends of the bolts which project into recesses 20 in the terminal blocks 17.

The terminal blocks 17 are made in sections, equal in longitudinal length to the width of the branch circuit control panel units to be hereinafter described and a terminal block is provided for each branch-circuit panel unit, the blocks being arranged in end-to-end relation, as indicated in Fig. 1, and serving to support transversely disposed conductive slide bars 31 that are arranged in spaced relation in such manner that four slide bars are supported at their ends upon two oppositely disposed terminal blocks.

The blocks are provided, on their sides facing the group 15 of terminal bars, with notches 32, in each of which the ends of insulating plates 33 (Figs. 3 and 5) are disposed. The plates 33 are disposed between the slide bars 31 to prevent outward movement of the bars 16 and to prevent accidental engagement of the selector contact, to be hereinafter described, that is slidably mounted on one bar, with the selector contact mounted on an adjacent slide bar.

As shown in Fig. 3, each panel unit comprises an insulating base 36 upon which is mounted a switch unit 37 containing two single-pole snap-action tumbler switches 38, and a fuse unit 39 containing two separate fuse receptacles 41 that are connected to the switch units 37 by means of conductor straps 42, each fuse receptacle being provided with a load-conductor terminal 43. The terminals 44 of the switches 38 are connected to conductor straps 45 that lead to the ends of the slide bars 31 and are attached thereto by the screws 46 which serve to secure the bars 31 to the terminal blocks 17. It will be noted that the switches are connected to the alternate bars 31 upon each terminal block and that adjacent slide bars 31 are connected to switches that are disposed on opposite sides of the group of metering bars. This arrangement enables the placing of four slide bars, each connected to a different circuit upon two oppositely disposed terminal blocks and reduces the space requirement to a minimum.

Referring to Figs. 1 and 3, it will be noted that the cover plate 47 for the switch units 37 extends over the terminal blocks 17 and over the extreme ends of the insulating plates 33 that are disposed in the notches 32 and, therefore, serves to prevent outward displacement of the insulating plates 33 and the metering bars beneath the plates.

It is obvious that, by placing additional panel units containing the switches and fuse receptacles in side-by-side relation, any desired number of branch-line circuits may be accommodated by the panelboard and that, by adding insulating blocks 21 and 29 in side-by-side relation to those shown, any number of metering bars may be placed in the panelboard.

Referring particularly to Figs. 3, 5, 7, 8 and 9, the selector contact comprises an insulating knob or handle 48 upon which is secured a spring-metal contact jaw 49 of U-shape, and which is attached to the handle by means of a screw 51. The free ends 52 of the jaw are normally biased toward each other but, when moved into engagement with the edge of a metering bar, slightly separate to permit the contact portions of the jaw to yieldingly engage the sides of the bar.

Oblong slots 53 are oppositely disposed in the jaw members, through which the slide bar 31 extends and which permit of limited longitudinal movement of the contact jaw relative to the slide bar for the purpose of withdrawing the contact jaw from engagement with the metering bar beneath the slide bar. The selector contact may be moved along the slide bar in order to bring it into registry with any selected metering bar. In order to ensure good conductive engagement between the contact jaw 49 and the slide bar 31 when the contact jaw is in operative engagement with a metering bar, a conductive spring clip 54 of U-shape is conductively connected to the jaw 49 by the attaching screw 51, as indicated in Fig. 9. The free ends of the clip 54 are normally spaced apart a less distance than the diameter of the slide bar and are slightly flared at their extreme ends at 55, as shown in Figs. 8 and 9, in order to permit the slide bar to separate them when the selector contact is moved from the withdrawn position shown in Fig. 9 to the operative metering bar engaging position shown in Fig. 8. The clip 54 serves to yieldingly retain the selector contact in either its operative or its inoperative position, and, when the selector contact is in its inoperative position, it is withdrawn from engagement with the metering bar and, therefore, may be moved along the slide bar into registry with any selected metering bar, as desired.

Referring particularly to Fig. 6, wherein the wiring connections of the panelboard are illustrated, it will be noted that the metering bars 16 are each connected to a separate meter 56, through the medium of conductors 19 and that each slide bar 31 is connected to a separate load circuit 57 having a conductor 58 connected to a terminal block 59 that is connected to the neutral conductor 61 of the three-wire feed system. Current enters this system through the feed conductors 62 and 63, and, after passing through the main switch 64 and main fuse 65, it is conducted, through the current coil 66 of the meter, to a metering bar 16 and thence, through a selector contact jaw 49, to a slide bar 31, load circuit 57, to the neutral terminal 59 that is connected to the neutral feed conductor 61. Shifting of the selector contact into engagement with another metering bar connects its respective load circuit to the selected metering bar.

Referring particularly to Fig. 3, the metering panelboard is shown as enclosed within a sheet-metal housing 14 having a front trim plate 67 that is provided with an inwardly directed flange 68 to engage the outer corner of the fuse block 39. This arrangement provides a space 69 in which the branch-line conductors may extend to a suitable conduit outlet, not shown. The trim plate 67 is provided with a door 71 that is hinged thereto to close the space in which the selector contact handles 48 and the handles of the switches 38 and the fuses 72 are located.

The selector contact handles 48 and fuse blocks 39 are provided with circular indentations 34 in which legends 1 to 8 are marked for the purpose of identifying the selector contact handle with its respective fuse receptacle.

Referring to Fig. 4, a metering panel having a circuit-breaker control panel for each branch-line circuit is illustrated, the circuit-breaker unit 73 being mounted upon an insulating base block 74 which carries the circuit-breaker terminals 75 and 76, to be connected to the slide bar 31 in the manner in which the switch of the device shown in Fig. 1 is connected.

It is apparent from the foregoing that, by employing standard metering bar supporting blocks, load-circuit control-panel units or circuit-breaker panel units, a metering panel of any desired type having any desired number of branch-line circuits and metering bars may readily be assembled.

I do not desire to restrict myself to the two specific embodiments of my invention herein shown and described, since it is evident that it may be changed and modified without departing from the spirit and scope of my invention as defined in the appended claims.

I claim as my invention:

1. A metering panelboard comprising two rows of panel units disposed in side-by-side relation and the rows being spaced apart, metering bars disposed in parallel spaced relation between the rows of units, a separate terminal block for each unit, a slider bar for each unit extending across the metering bars and supported, at each end, upon the oppositely disposed terminal blocks, and a selector contact slidably mounted on the slider bar for selectively engaging the said metering bars.

2. A metering panelboard comprising two rows of panel units disposed in side-by-side relation and the rows being spaced apart, metering bars disposed in parallel spaced relation between the rows of units, a separate terminal block for each unit, a slider bar for each unit extending across the metering bars and supported, at each end, upon the oppositely disposed terminal blocks, a selector contact slidably mounted on the slider bar for selectively engaging the said metering bars, and insulating plates extending between the slider bars and detachably supported upon the terminal blocks.

3. A metering panelboard comprising a group of spaced parallel metering bars, a plurality of conductive slider bars extending transversely of the metering bars and spaced therefrom, insulating terminal blocks disposed on each side of the metering bars and supporting the slider bars, a selector contact slidably mounted on the slider bars for selectively engaging the metering bars, and an insulating separator plate disposed between each slider bar and supported by the said blocks for preventing accidental contact of the selector contacts and outward movement of the metering bars.

4. A metering panelboard comprising a group of spaced parallel metering bars, a plurality of conductive slider bars extending transversely of the metering bars and spaced therefrom, insulating terminal blocks disposed on each side of the metering bars and supporting the slider bars, a selector contact slidably mounted on the slider bar for selectively engaging the metering bars, a plurality of notched insulating blocks extending between the oppositely disposed terminal blocks and supporting the metering bars in the notches thereof, and means for drawing the insulating blocks together to clamp the metering bars in position.

5. In a panelboard having a group of spaced bus bars arranged in parallel relation, the combination with the said bars, of a plurality of complementary insulating blocks disposed in side-by-side relation and recessed to receive and support the bars in spaced relation, whereby any desired number of bars may be supported by adding the said blocks, and means on the bars cooperating with the blocks for preventing longitudinal displacement of the said bars.

6. In a metering panelboard, in combination, two rows of panel units disposed in side-by-side relation, the rows being spaced apart, each panel unit comprising an insulating base and an automatic circuit breaker mounted on the base, metering bars disposed in parallel spaced relation between the rows of panel units, a separate terminal block for each unit, a slider bar for each unit extending across the metering bars and supported at each end upon the oppositely disposed terminal blocks, and a selector contact slidably mounted on the slider bar for selectively engaging the said metering bars.

HAROLD G. BAXTER.